No. 897,901. PATENTED SEPT. 8, 1908.
W. S. HUFFAKER.
CORN CUTTER.
APPLICATION FILED MAR. 19, 1908.

Witnesses
T. L. McKane
J. F. Vashon

Inventor
Warren S. Huffaker
By Geo. S. Vashon
Attorney

UNITED STATES PATENT OFFICE.

WARREN S. HUFFAKER, OF KIPTON, OHIO.

CORN-CUTTER.

No. 897,901.  Specification of Letters Patent.  Patented Sept. 8, 1908.

Application filed March 19, 1908. Serial No. 422,027.

*To all whom it may concern:*

Be it known that I, WARREN S. HUFFAKER, a citizen of the United States, residing at Kipton, in the county of Lorain and State of Ohio, have invented new and useful Improvements in Corn-Cutters, of which the following is a specification.

This invention relates generally to corn cutters, and particularly to a novel form of device of this character adapted to be secured to the foot of the user.

The object of the invention is to render it possible for an operator, without added fatigue, and with both hands left free for grasping and shocking the several stalks for binding, to cut a greater quantity of stalks, either of drilled or hilled corn, in a given time, than could possibly be done by the methods commonly in vogue, whereby a pronounced saving in labor and expense is effected. Furthermore to secure the above results without danger of injury to the operator or of undue wear of his boots or shoes.

With the above and other objects in view, as will appear as the nature of the invention is better understood, the same consists in the novel construction and combination of parts of a foot corn cutter, as will be hereafter fully described and claimed.

Figure 1:
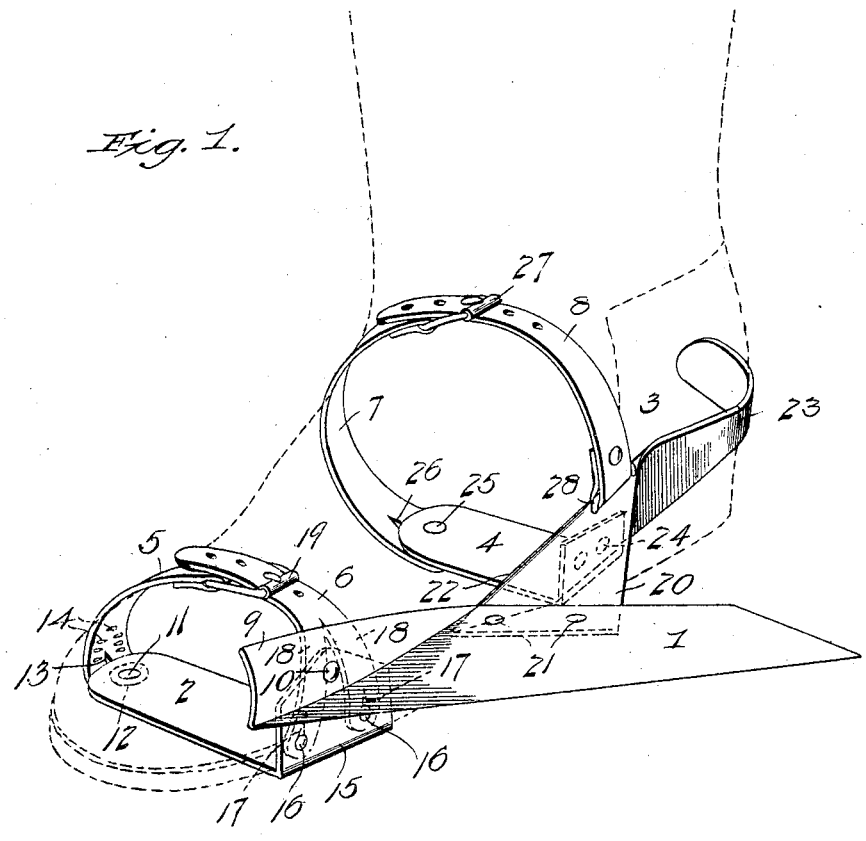
Figure 2:
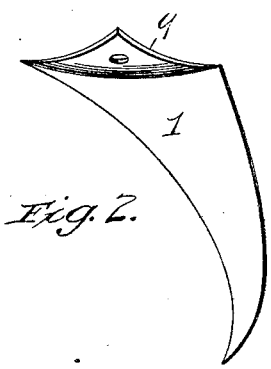
Figure 3:
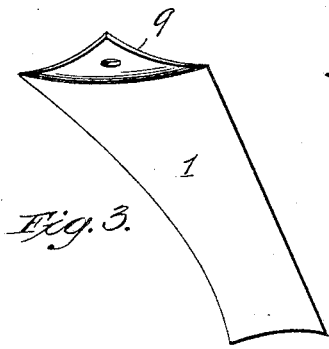
Figure 4:
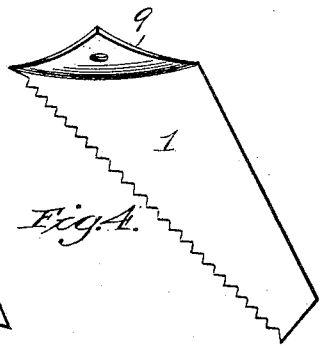

In the accompanying drawings: Figure 1 is a view in perspective of the device showing the same applied to a boot, the latter being indicated in dotted lines. Figs. 2, 3, and 4 are perspective views of modified forms of knives that may be employed in lieu of that shown in Fig. 1.

The implement comprises a knife (1), a stirrup (2), a brace (3), an arch plate (4), a toe strap consisting of two sections (5) and (6), and a heel strap consisting of two sections (7) and (8).

The knife may have a straight cutting edge as shown in Fig. 1, a hooked cutting edge as shown in Fig. 2, a curved cutting edge as shown in Fig. 3, or a sinuous or toothed cutting edge as shown in Fig. 4.

The front end of the knife is provided with an inward curved shield (9) that is disposed at an angle to the edge of the knife and is designed to fit over the toe portion of the shoe at its outer side, and is designed to protect the user of the implement from bruises and to prevent undue wear of the shoe.

The stirrup, which as shown in Fig. 1, is approximately L shaped, is loosely pivoted to the shield 9, at any preferred point in its length by a rivet (10) the heads of which are countersunk thus to prevent the presentation of protuberances that would be objectionable. Secured in an orifice in the outer portion of the tread of the stirrup is a stud (11) having a head (12) that projects below the under side of the tread and is engaged by an eye (13) in the strap section 5 whereby to permit its ready detachment therefrom. The strap is reinforced on each side of the eye and for some distance beyond the same by staples (14) that are clenched in position. The side plate (15) of the stirrup carries two headed studs (16) that are engaged by eyes (17) formed in the two branches (18) of the strap section (6). This strap is provided with openings to be engaged by the tongue of a buckle (19) carried by the strap (5).

The shank (20) brace 3 is disposed approximately at right angles to the back edge of the knife, and may be either integral therewith or secured thereto by rivets (21) and is bent downward at an acute angle to the said edge, as shown at (22) and its rear portion is curved to form the heel brace (23) that is designed to fit around the counter of the shoe of the wearer. The arch-plate 4, which may be integral with, or secured to the heel brace by rivets (24) extends at right angles thereto. Projecting beyond the under side of the plate is a headed stud (25) which is engaged by an eye (26) of the heel strap section (7), which latter carries a buckle (27). The other heel strap section 8 is secured to a staple (28) carried by the rear portion of the shank (20), and is provided with openings to be engaged by the tongue of the buckle 27.

In operation, the implement is, in this instance attached to the left foot with the knife outward and the toe or stirrup strap and the instep strap drawn rather tight. Now grasp the stalks under the left arm, and swing the left foot forward with an easy stroke, not against the stalks but to the right side, as though the intention were to kick past them. As the right foot is brought forward, more stalks are reached for with the right hand, holding the bundle as it is gathered under the left arm and back of the left hip. Now extend the left arm to receive the incoming bundle and as the foot, with the knife, is again swung forward, give the right hand a backward sweep which will carry the bundle into position under the left arm, and so on.

What I claim is.

1. A device of the class described comprising a heel brace, a shank, a knife carried by the shank, a shield carried by the knife, a stirrup, and means for securing the device to the boot of the user.

2. A device of the class described comprising a heel brace, a shank, and knife secured to the shank, a shield carried by the knife, an arch plate, a stirrup pivoted to the shield and straps to secure the device to the boot of a user.

In testimony whereof, I affix my signature in presence of two witnesses.

WARREN S. HUFFAKER.

Witnesses:
 E. H. GIBBS,
 E. KEMP.